B. B. BETTS.
BAGGAGE MEASURING DEVICE.
APPLICATION FILED MAY 31, 1913.
1,119,058.
Patented Dec. 1, 1914.
2 SHEETS—SHEET 1.
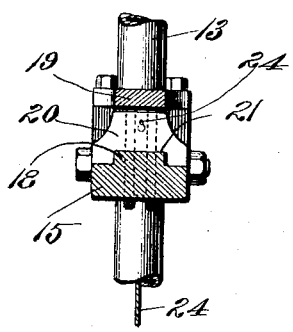
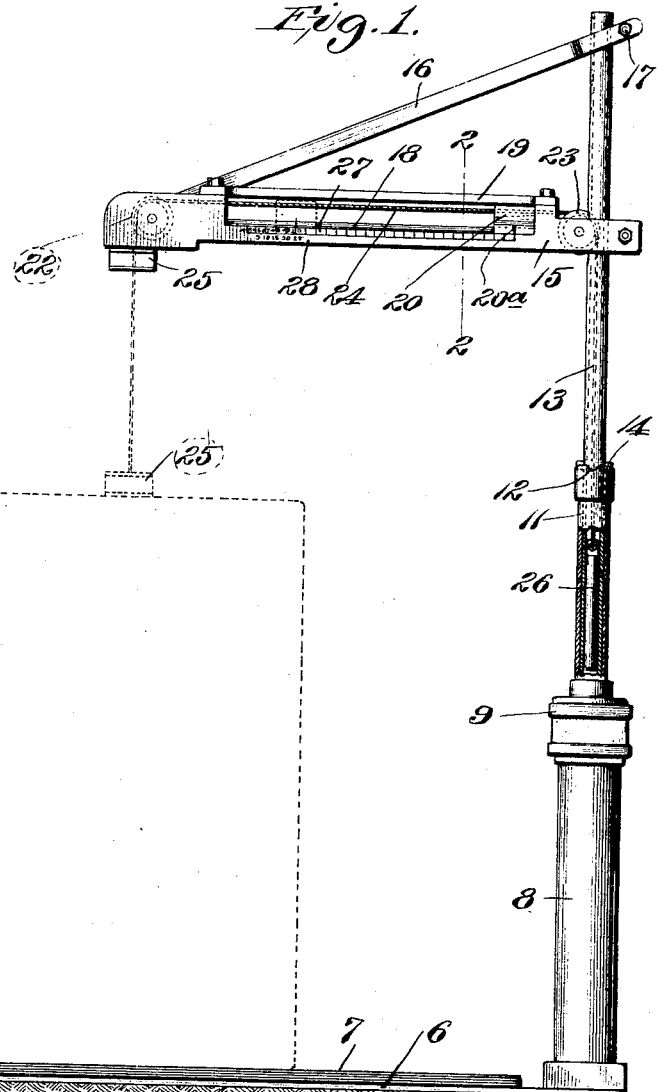
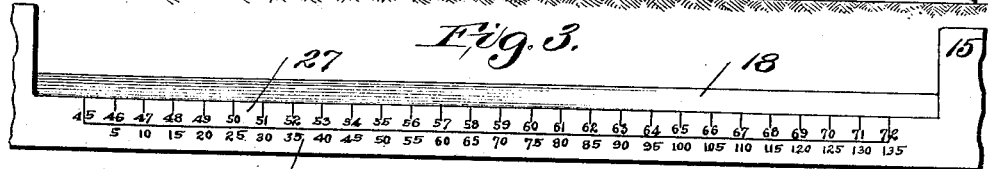
Inventor:
Benjamin B. Betts, B. B. BETTS.
BAGGAGE MEASURING DEVICE.
APPLICATION FILED MAY 31, 1913.
1,119,058.
Patented Dec. 1, 1914.
2 SHEETS—SHEET 2.
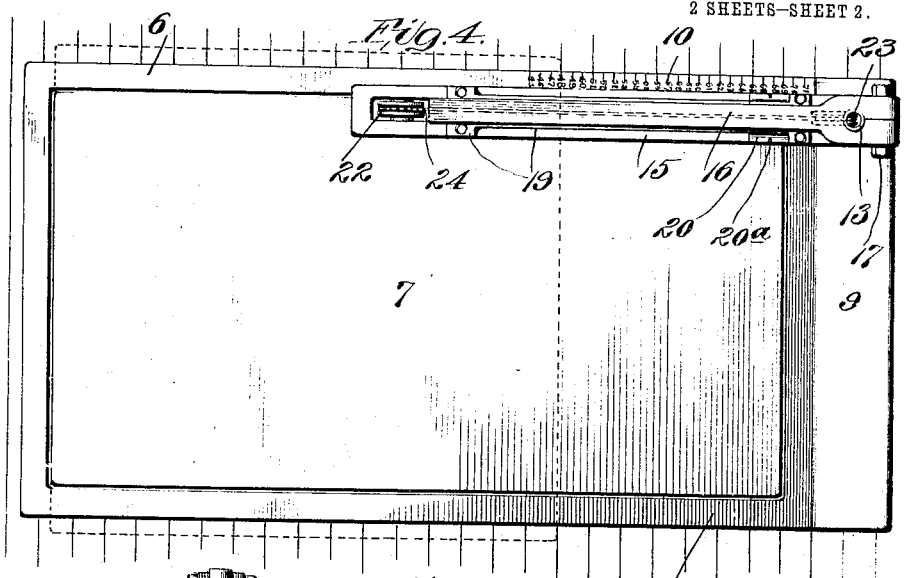
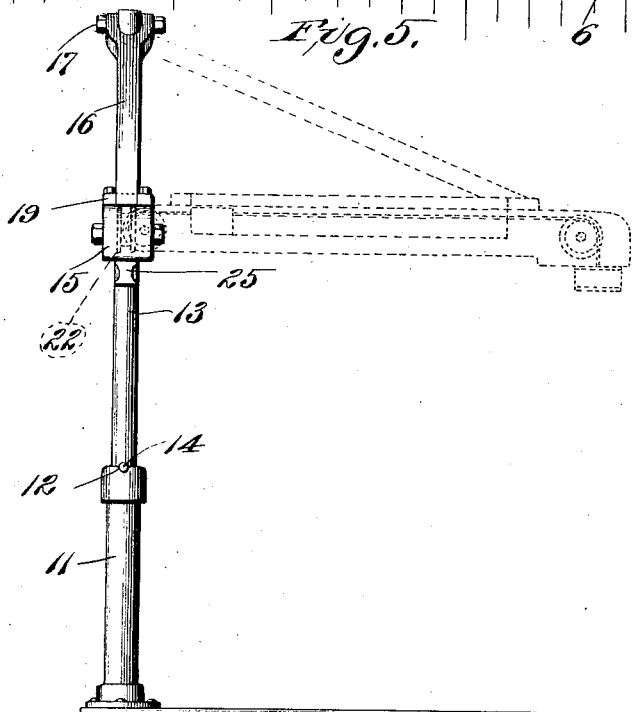
Attest:
Inventor:
Benjamin B. Betts,

UNITED STATES PATENT OFFICE.

BENJAMIN B. BETTS, OF ST. LOUIS, MISSOURI.

BAGGAGE-MEASURING DEVICE.

1,119,058.     Specification of Letters Patent.     Patented Dec. 1, 1914.

Application filed May 31, 1913. Serial No. 770,989.

*To all whom it may concern:*

Be it known that I, BENJAMIN B. BETTS, a citizen of the United States, and resident of St. Louis, Missouri, have invented certain new and useful Improvements in Baggage-Measuring Devices, of which the following is a specification containing a full, clear, and exact description, reference being had to the accompanying drawings, forming a part hereof.

My invention relates to improvements in baggage measuring devices, and the object of my invention is to construct a simple and inexpensive device, preferably in the form of an attachment to weighing scales, for the purpose of determining the size of baggage.

It is now the practice to determine the amount of baggage which may be checked on a passenger's ticket to weigh the baggage, and if the baggage is found to weigh more than the prescribed weight excess baggage is charged. By this method the abnormally large pieces of baggage which occupy great space, but are within the prescribed weight, are transported without extra charge. A recent law has been passed limiting the size of pieces of baggage which may be carried free with a passenger's ticket, the law prescribing a fixed rate for baggage in excess of the prescribed size.

With the above purposes in view my invention consists in certain novel features of construction and arrangement of parts as will be hereinafter more fully described, set forth in the claims and illustrated by the accompanying drawings, in which—

Figure 1 shows in elevation with parts broken away a device constructed according to my invention; Fig. 2 is an enlarged detail sectional elevation taken on the line 2—2 of Fig. 1 illustrating the construction of the arm and sliding-gage block; Fig. 3 is an enlarged detail elevation of the fixed gage, portions of the arm being removed; Fig. 4 is a plan of the device as shown in Fig. 1; and Fig. 5 is a front elevation of a scale equipped with my improved device.

Referring by numerals to the accompanying drawings: 6 designates the base or pit frame, 7 the scale platform, 8 the column and 9 the beam arm of an ordinary platform scale which is the type usually employed in places where baggage is handled. Applied to the pit frame 6 is a fixed dimension scale 10 having designating numerals from forty five to seventy two inclusive. Mounted on top of the beam arm 9 is a hollow upright 11 having in its top the radial notches 12. Mounted for rotation in the upright 11 is a hollow stem 13 having diametrically opposite pins 14 for engagement in the notches 12 of the upright. Extending laterally from the stem 13 is an arm 15 and extending from the outer end of the arm to and connecting with the stem 13 is a strut 16 for the purpose of holding the arm 15 horizontally.

As shown in Fig. 4, the strut 16 is bifurcated at its end embracing the stem 13, and extended through the bifurcated end is a clamping bolt 17. The end of the arm 15 which embraces the stem 13 is constructed identically like the bifurcated end of the strut. Extending lengthwise of the arm 15 there is a rib 18 and detachably secured to the arm and in a plane above the rib there is a retaining strip 19. Arranged for movement lengthwise of the arm 15 between the arm and the retaining strip there is a sliding gage block 20 having in its under surface a groove 21 which embraces the rib 18, and on one or both of its side faces an indicator 20ª. Rotatably mounted in the arm 15 adjacent its free end there is a pulley 22 and rotatably mounted in the arm and extending into the hollow stem 13 is a pulley 23. Arranged for travel over the pulleys there is a flexible element 24 and secured to the element adjacent the free end of the arm 15 there is a block 25. Secured to the opposite end of the flexible element 24 and arranged for vertical movement in the stem 13 is a weight 26. Arranged on one or both of the side faces of the arm 15 there is a fixed dimension scale 27 having designating numerals from forty five to seventy two inclusive, and coincident with the scale 27 there is a comparative pound scale 28.

In the practical operation of my device a piece of baggage, as is illustrated in dotted lines in Figs. 1 and 4, is placed upon the platform scale 7 and, as shown by Fig. 4, the one dimension of the piece of baggage is in excess of the prescribed forty five inches. To determine another dimension of the piece of baggage the operator grasps the block 25 and moves it to a position, as shown by dotted lines in Fig. 1, to engage the piece of baggage, thus moving the sliding gage block 20 to a point on the arm 15 where the indicator, carried by the sliding gage block, will point to the dimension of the piece of baggage. By releasing the block 25 the weight 26 will automatically draw the block and sliding gage block to their normal positions.

By the employment of the sliding gage block the dimensions of a piece of baggage may be determined with a minimum amount of handling of the baggage and with a device always at hand, as distinguishable from portable scaling devices, such as yard sticks and the like. It is to be observed that this particular piece of baggage has a dimension in one line of forty eight inches. This is the dimension determined from the margin of the scale platform to the numeral forty eight of the fixed dimension scale 10. It is to be observed further that another dimension, as shown by the sliding gage block, is fifty inches and it will be assumed that the remaining dimensions are within the prescribed dimension. It is to be observed from the fixed scale on the arm 15 that coincident with each dimension numeral there is a second numeral which is divisible by five, from which second numeral may be determined the excess charge as compared to so many pounds. This particular piece of baggage that has been measured in this example is five inches oversize in one dimension, for which an excess charge for twenty five extra pounds will be made and in another dimension this particular piece of baggage is three inches oversize for which an excess charge for fifteen extra pounds will be made, thus this piece of baggage will be overcharged for twenty five and fifteen, or forty pounds excess baggage. If one of the other dimensions exceeds forty five inches the excess baggage will be determined as above.

I claim:

1. In a device for measuring baggage, a platform having a fixed dimension scale for determining lengths and widths of pieces of baggage, an arm mounted over the platform having a fixed dimension scale and a comparative pound scale, a movable gage block mounted upon said arm, and a block having a flexible connection with said gage block for determining the height of pieces of baggage.

2. In combination with a weighing scale having a fixed dimension scale thereon for determining the weight and the length and breadths of pieces of baggage, a swinging arm, mounted over said weighing scale, having a fixed dimension scale and a comparative pound scale thereon, a gage block arranged for movement over said arm, a weight for normally holding the gage block to one of its limits of movement, and a block having a flexible connection with said gage block, substantially as shown and for the purposes stated.

In testimony whereof, I have signed my name to this specification, in presence of two subscribing witnesses.

BENJAMIN B. BETTS.

Witnesses:
 E. L. WALLACE,
 N. G. BUTLER.